D. D. WADSWORTH.
Wind-Engine.
No. 205,426.  Patented June 25, 1878.
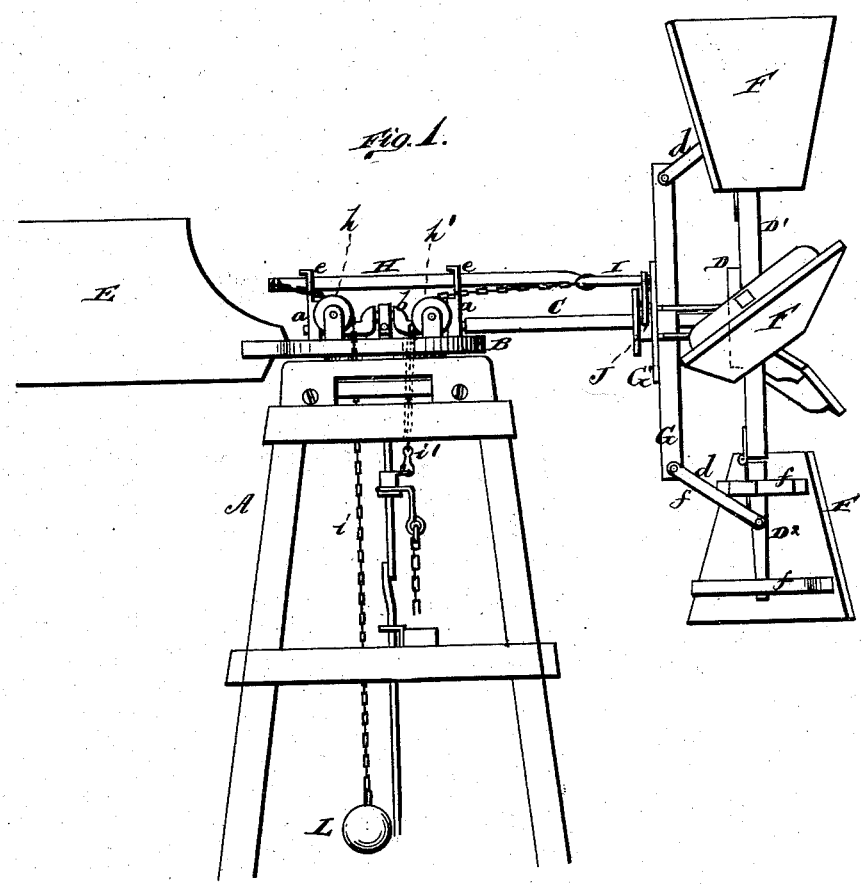
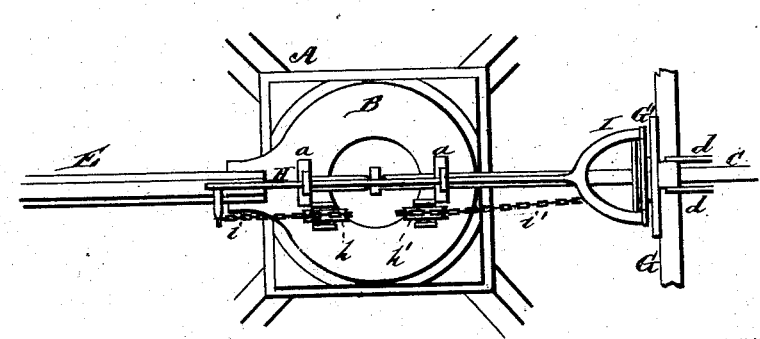

UNITED STATES PATENT OFFICE.

DAVID D. WADSWORTH, OF COLUMBUS, NEBRASKA.

IMPROVEMENT IN WIND-ENGINES.

Specification forming part of Letters Patent No. 205,426, dated June 25, 1878; application filed March 9, 1878.

*To all whom it may concern:*

Be it known that I, DAVID D. WADSWORTH, of Columbus, in the county of Platte and State of Nebraska, have invented a new and valuable Improvement in Windmills; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of my windmill. Fig. 2 is a plan view of the same.

My invention relates to windmills; and it consists in the construction and arrangement of the wind-wheel and the governing devices, whereby the motion of the wind-wheel may be regulated in a prompt and efficient manner, as will be hereinafter more fully set forth.

The annexed drawings, to which reference is made, fully illustrate my invention.

A represents the tower of the windmill, with the turn-table B thereon. On the turn-table are suitable bearings $a\ a$, in which is placed the wind-wheel shaft C. This shaft is made of square form, except at the points in the bearings, and between these it is formed with the crank $b$, on which the rod is placed.

E represents the usual vane secured to the turn-table.

The wind-wheel, secured to the end of the shaft C, is composed of a hub, D, from which extend a series of radial arms, each made in two sections, $D^1$ and $D^2$, hinged together, as shown. On the outer section, $D^2$, of each arm are secured two cross-bars, $f f$, and to these is fastened the fan F, which is set at an angle to the arm, substantially as shown, so that the wind in striking the same will cause the wheel to revolve.

The outer section, $D^2$, of each wheel-arm is, by two links or rods, $d\ d$, connected with an arm, G, projecting from a hub, G', placed loosely on the shaft C, there being a corresponding number of arms, $D^1$, $D^2$, and G. The hub G' is capable of sliding on the shaft C out and in, but cannot turn thereon.

On top of the boxes or bearings $a\ a$ are formed or attached guides $e\ e$, through which passes a bar, H, capable of sliding backward and forward in said guides. The front end of the bar H forms a fork, I, the prongs of which are fastened to a semicircular band, J, and this band fits in a circumferential groove on an inward extension of the hub G'.

To the rear end of the bar H is attached a chain, $i$, which passes forward over a pulley, $h$, on the turn-table, and then downward into the tower, where a weight, L, is attached to said chain. This weight holds the bar H pushed forward, so that by means of the arms G and links $d$ the fans F will be held in the wind. As the wind increases and overbalances this weight the fans F turn more or less backward, the sections $D^2$ of the wheel-arms turning on their hinges and forcing back the bar H. As the wind decreases, the weight L brings the fans forward in the wind again.

Another chain, $i'$, is attached to the fork I, and passes rearward over a pulley, $h'$, and then downward into the tower, by means of which the operator can throw the fans out of the wind at any time when it is desired to stop the wheel.

Having thus fully described my invention, what I claim as new, and desire to secure by Letters Patent, is—

1. A wind-wheel consisting of the radial arms $D^1$, hinged at or near the center, and provided with vanes or sails F, parallel pivoted brace-rods $d\ d$, and arms G G, substantially as described, and for the purpose set forth.

2. The hinged radial arms $D^1$, provided with vanes or sails F, parallel brace-rods $d\ d$, and arms G G, in combination with the turn-table B, sliding governor-arm H, chain I, pulley $h$, and weight L, substantially as described, and for the purpose set forth.

In testimony that I claim the above I have hereunto subscribed my name in the presence of two witnesses.

DAVID D. WADSWORTH.

Witnesses:
  H. J. HUDSON,
  PERRY LOSHBAUGH.